March 7, 1961 J. M. COOPER 2,974,269

SIGNAL VOLTAGE AMPLITUDE LIMITER AND PHASE DISCRIMINATOR

Filed May 31, 1957

Inventor:
James M. Cooper,
by Francis X. Doyle
His Attorney.

United States Patent Office 2,974,269

Patented Mar. 7, 1961

2,974,269

SIGNAL VOLTAGE AMPLITUDE LIMITER AND PHASE DISCRIMINATOR

James M. Cooper, Schenectady, N.Y., assignor to General Electric Company, a corporation of New York Filed May 31, 1957, Ser. No. 662,695

2 Claims. (Cl. 323—9)

This application is a continuation-in-part of my previously filed application, Serial No. 282,497, filed April 15, 1952, now Patent No. 2,802,167, issued August 6, 1957, and assigned to the same assignee as the present invention.

My invention relates to apparatus for limiting amplitude and for discriminating phase of a modulated alternating signal voltage. The apparatus is particularly useful as an amplitude limiter, but it may be rendered phase selective so that its output signal varies in magnitude with phase variation.

In amplitude limiting circuits heretofore known, it is the usual practice to limit amplitude to a fixed predetermined maximum value, as by merely clipping off the voltage wave whenever it exceeds a predetermined value, which value remains fixed throughout each half cycle. Such simple clipping often results in considerable distortion of the wave shape, as when a sinusoidal wave is limited to a maximum instantaneous amplitude considerably below its actual peak value. In such case the limited output will be very nearly a square wave. In certain signal circuits such wave distortion cannot be tolerated.

Accordingly, therefore, it is a principal object of my invention to provide a new and improved amplitude limiter for alternating signal voltages which, to a large extent at least, preserves the original wave form while limiting its peak amplitude.

It is a further object of my invention to provide a new and improved phase selective amplitude limiter for alternating current signal voltages, to pass with distortionless limiting operation signal voltages of selected phase only, and reject signal voltages of an opposite phase.

Another object of my invention is the provision of an instantaneous polarity selective signal limiter which will limit an amplitude modulated signal and discriminate a phase modulated signal.

In carrying out my invention in one form, I provide a double diode limiter of the type in which a pair of oppositely poled biased diodes are connected in parallel circuit relation across a pair of signal voltage output terminals, and I bias the diodes by interposing between one terminal of each diode and one of the signal output terminals opposite biasing potentials which vary in magnitude over each half cycle substantially in accordance with the wave shape of the signal voltage. More specifically, I supply to the limiting diodes opposite biasing potentials of pulsating unidirectional character wherein biasing pulses of fixed peak value are synchronized with the half cycles of the signal voltage and have a pulse shape corresponding to the wave shape of the signal voltage. Where the biasing potentials are supplied by opposite half wave rectification from a voltage source of the same phase and frequency as the signal voltage, the apparatus serves to limit the amplitude of a signal voltage of one phase, and to short circuit or reject signal voltages of opposite phase. This phase selective limiter, being sensitive to instantaneous polarity, passes all of an in-phase signal and none of a signal of opposite phase.

My invention itself will be more fully understood and its various objects and advantages further appreciated by referring now to the following detailed specification taken in conjunction with the accompanying drawing, in which.

Figure 1:
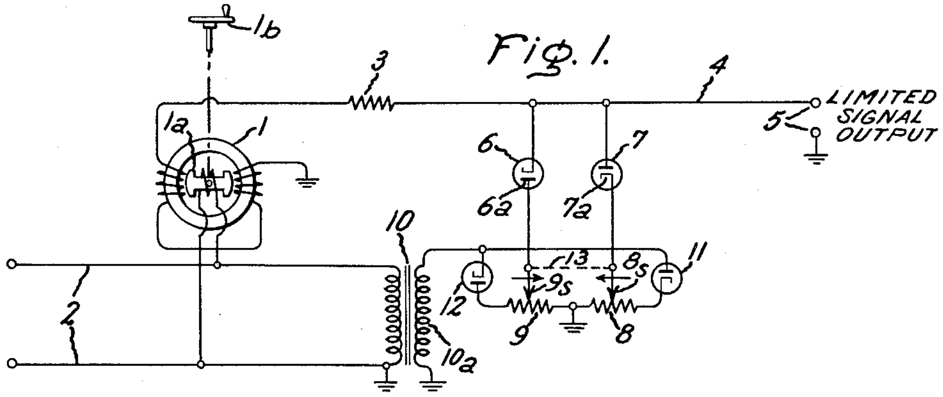
Fig. 1 is a schematic circuit diagram of a phase selective amplitude limiter embodying my invention in one form.

Referring now to the drawing and particularly to Fig. 1, I have there shown an apparatus in which an amplitude modulated alternating signal voltage is derived through a signal generator 1 of the selsyn type from an alternating current supply source indicated as an alternating current line 2. The signal voltage from the signal generator 1 is applied through a current limiting resistor 3 and a conductor 4 to a pair of signal output terminals 5, one side of the line 2 and one of the terminals 5 being connected together through ground as indicated. By way of illustration I have shown the signal generator 1 as being of the selsyn type in which an alternating signal voltage of predetermined phase and frequency is modulated in amplitude in accordance with the position of a rotor member 1*a*, the rotor being controlled in position by a controlling member shown by way of example as a rotatable hand wheel 1*b*. It will of course be understood by those skilled in the art that other well known types of amplitude modulators may be utilized to derive a desired signal voltage from the alternating current supply line 2.

In order to limit the amplitude of the signal voltage supplied to the signal output terminals 5, I connect across these terminals in parallel circuit relation a pair of diodes 6 and 7 and provide means for variably biasing the diodes in opposite senses in accordance with the wave shape of the signal wave itself. By way of illustration, I have shown the diodes 6 and 7 as being two-electrode electron discharge devices, but it will be understood by those skilled in the art that, if desired, other types of unilateral conducting devices, such as crystal diodes or metallic rectifiers, may be used.

The diodes 6 and 7 are biased by interposing between one terminal of each of the diodes and one of the output terminals 5 sources of pulsating unidirectional biasing potential of opposite polarity. More specifically, the cathode 7*a* of the diode 7 and the anode 6*a* of the diode 6 are connected to the grounded output terminal 5 through potentiometers 8 and 9, respectively. The instantaneous biasing voltages supplied to the diodes 6 and 7 by the potentiometers 8 and 9 are caused to vary over each half cycle of the signal voltage substantially in accordance with the wave shape of the signal voltage. This I accomplish by connecting the potentiometers 8 and 9 in parallel circuit relation in a half wave rectifier circuit supplied from the alternating current supply source 2 through a transformer 10. It will of course be understood by those skilled in the art that the rectified current supplied to the potentiometers 8 and 9 may, if desired, be derived from other alternating current supply sources having the same phase and frequency as the signal voltage itself. More specifically, the secondary winding 10*a* of the transformer 10 is connected in parallel circuit relation with a pair of opposite poled half wave rectifiers, shown as diodes 11 and 12 and their potentiometers 8 and 9, respectively. The common terminal of the potentiometers 8 and 9 is connected to the grounded output terminal 5, and the potentiometer sliders 8*s* and 9*s* are connected, respectively, to the diodes 6 and 7. It will, of course, be understood by those skilled in the art that while I have shown the diodes 11 and 12 as two element-electron discharge devices, other suitable unilateral conducting devices such as crystal diodes or metallic rectifiers may be utilized if desired. The peak amplitude of the biasing potentials supplied to diodes 6 and 7 may be varied by controlling the sliders 8*s* and 9*s* on the potentiometers 8 and 9, and it is convenient that these sliders be mechanically interlocked so that they move together, as indicated by the dotted line 13 of the drawing. As indicated by arrows on the drawing, the potentiometer sliders 8*s* and 9*s* are mechanically so interconnected that they both move together either toward or away from their common grounded ends.

Figure 3:
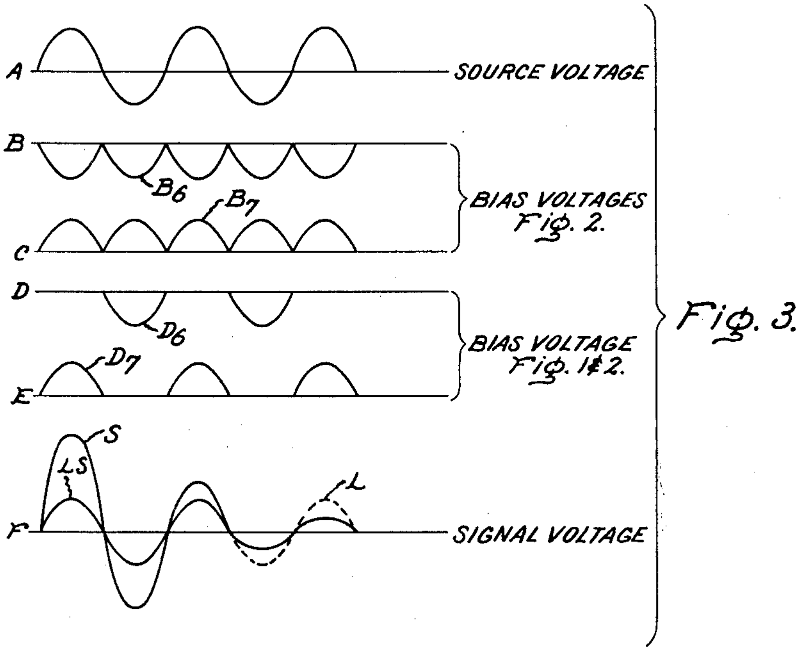
Fig. 3 is a combined graphical representation of certain of the electrical operating characteristics of the circuits shown at Figs. 1 and 2.

The operation of the phase selective signal amplitude limiter shown at Fig. 1 will now be more fully understood by referring to Fig. 3 of the drawing, and more particularly to diagrams A, D, E and F of Fig. 3. Diagram A of Fig. 3 is a graphical representation of the alternating supply voltage appearing at the line 2, this voltage being fixed in amplitude and being of predetermined phase and frequency. The curve S of diagram F, Fig. 3, indicates a typical signal voltage output from the signal generator 1, this signal voltage corresponding in phase and frequency to the voltage of the source 2 but varying in amplitude. At curve $D_6$ of diagram D, Fig. 3, I have illustrated the pulsating unidirectional potential appearing across that portion of the potentiometer 9 between the slider and ground during negative half cycles of the source voltage and which is applied as a bias to the diode 6. The corresponding biasing potential of opposite polarity appearing at the potentiometer 8 during positive half cycles of the source voltage and applied to the diode 7 is shown as curve $D_7$ on diagram E, Fig. 3. It will be observed that the pulsating unidirectional biasing potentials $D_6$ and $D_7$ are synchronized with half cycles of the supply voltage shown at diagram A, and that the pulse frequency of the biasing potentials is equal to the frequency of the supply voltage and signal voltage, while the pulse shape of the biasing pulses, being sinusoidal as illustrated, corresponds to the sinusoidal wave shape of the signal voltage and supply voltage. The biasing pulses are of fixed peak amplitude.

It will now be evident to those skilled in the art that in operation, whenever the instantaneous value of the alternating signal voltage at any point in a half cycle exceeds the instantaneous value of the biasing potential at the same instant, either the diode 6 or the diode 7 becomes conductive (depending upon the instantaneous polarity of the signal voltage) thereby to shunt the signal output terminals and to limit the voltage thereacross to the instantaneous value of the biasing potential. In effect, this means that the voltage between the signal output terminals 5 during any half cycle cannot be greater at any instant than the instantaneous value of the bias voltage on that diode, 6 or 7, which is poled to shunt signal voltages of the then existing polarity. Thus, the amplitude limit imposed upon the signal voltage is not a fixed unvarying limit, but is a limit which varies sinusoidally in the manner shown at diagrams D and E of Fig. 3. This is more clearly illustrated at diagram F of Fig. 3, where the curve S illustrates a signal voltage varying in amplitude and generated, for example, in the signal generator 1, while the curve LS illustrates the limited signal voltage as it appears at the output terminals 5. The dotted curve portion L at diagram F indicates the limiting value of the bias voltage during two half cycles when this limiting value is not attained by the applied signal voltage.

In addition to being a limiter the circuit of Fig. 1 is sensitive to instantaneous polarity, so that it acts as a phase selector to pass and limit signal waves of one phase and to reject, by short circuiting, signal waves of opposite phase. If a signal voltage of opposite polarity is applied to the circuit of Fig. 1, the diode 6, being unbiased during negative half cycles of such a signal wave, short circuits the signal, and the diode 7, being unbiased during positive half cycles of the signal wave, similarly short circuits the signal. Thus, a signal wave of the polarity shown at diagram F of Fig. 3 is passed by the circuit of Fig. 1 with the limiting action described, while a signal wave of opposite polarity is rejected or short circuited through the diodes 6 and 7. If it is desired to pass the oppositely phased signal and reject the in-phase signal, it can be accomplished by reversing the connections on winding 10*a*. It will now be evident that the limiter of Fig. 1 is sensitive to instantaneous polarity, so any signal wave intermediate in phase between the source voltage and a voltage of opposite phase will be passed in part and rejected in part.

Figure 2:
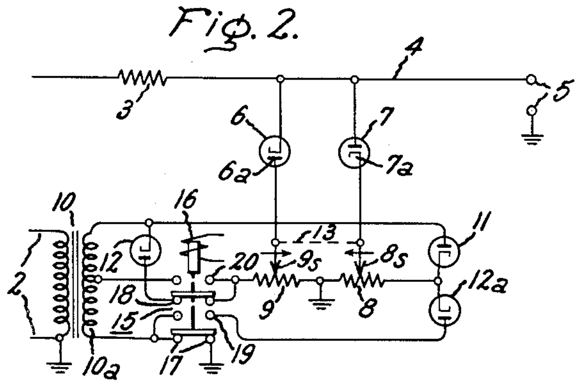
Fig. 2 is a schematic circuit diagram of a phase selective amplitude limiter capable of providing either or both functions.

Fig. 2 discloses another embodiment of my invention whereby the pulse frequency of the biasing voltage applied to diodes 6 and 7 may have a frequency equal to the frequency of the signal voltage or twice the frequency of the signal voltage. In my copending patent application, Serial No. 282,497, I have disclosed and claimed an amplitude limiter in which the pulse frequency of the biasing voltage is twice the frequency of the signal voltage. As therein disclosed the biasing voltage is obtained by full wave rectification of a voltage source of the same phase and frequency as the signal voltage. The circuit of Fig. 2 provides either full wave rectification or half wave rectification of a voltage source, as desired, through the use of three diodes and a switching device. This circuit is especially useful in Automatic Approach Systems for aircraft of the type disclosed in my Patent No. 2,717,132, issued September 6, 1955.

Referring now to Fig. 2, there is shown a circuit similar to Fig. 1 but providing either full wave rectification or half wave rectification of a voltage source to supply a biasing voltage for the diodes 6 and 7. Only part of the circuit is shown, it being understood that the remainder of the circuit is the same as shown in Fig. 1. A signal voltage from a signal generator, not shown, is applied through a current limiting resistor 3 and conductor 4 to a pair of output terminals 5, one of which is connected to ground, as shown. The diodes 6 and 7 are connected across the terminals 5, in parallel circuit relation and means are provided to variably bias the diodes to limit the amplitude of the signal voltage and to provide phase selectivity, when desired. Bias voltages for the diodes 6 and 7 are obtained from the supply line 2 through the transformer 10, in the same manner as in Fig. 1. Half wave rectification of the voltage across secondary winding 10*a* is provided by diodes 11 and 12, while full wave rectification is provided by diodes 11 and 12*a*.

To obtain either full wave or half wave rectification of the source voltage a switching device 15 is provided, operated by a solenoid 16. The switching device 15 is provided with pairs of complementary contacts, 17, 18, 19 and 20. As shown in Fig. 2 contacts 17 and 18 are closed, placing diodes 11 and 12 in parallel circuit relation with transformer secondary 10*a*, thereby providing a half wave rectifier. With the switch 15 in this position the circuit of Fig. 2 acts as an amplitude limiter and phase discriminator in the same manner as previously described for Fig. 1. When solenoid 16 is energized, in any known manner, switch 15 is operated to open contacts 17 and 18 and to close contacts 19 and 20. This operation of switch 15 places the diodes 11 and 12*a* in circuit relation with secondary winding 10*a*. The anodes of the diodes 11 and 12*a* are connected to opposite terminals of the winding 10*a*, while their cathodes are connected to the mid-point of the winding through the resistors 8 and 9. In this position of switch 15, full wave rectification of the voltage impressed on the winding 10*a* is provided. The operation of this circuit as a full wave rectifier to supply biasing voltage to diodes 6 and 7 is fully explained in my copending patent application, Serial No. 282,497.

The operation of the circuit of Fig. 2 will now be evident to those skilled in the art. With switch 15 in its first position, closing contacts 17 and 18, a pulsating, unidirectional biasing voltage is applied to the diodes 6 and 7 as shown in diagrams D and E of Fig. 3. That is, the biasing potential $D_6$ is applied to the anode *6a* of diode 6 while the biasing potential $D_7$ is applied to the cathode *7a* of diode 7. When switch 15 is in its second position, closing contacts 19 and 20, a pulsating, unidirectional biasing voltage is applied to diodes 6 and 7 as shown in diagrams B and C of Fig. 3. The biasing potential $B_6$ is applied to the anode *6a* of diode 6 while biasing potential $B_7$ is applied to the cathode *7a* of diode 7. Thus it is seen that the circuit of Fig. 2 provides a phase selective amplitude limiter when switch 15 is in its first position, and an amplitude limiter without phase selectivity when switch 15 is in its second position.

While I have described certain preferred embodiments of my invention by way of illustration, many modifications will appear obvious to those skilled in the art. I intend to cover all such modifications as fall within the spirit and scope of my invention in the following claims.

What I claim as new and desire to secure by Letters Patent of the United States is:

1. A combined amplitude limiter and phase discriminator for an amplitude modulated alternating signal voltage comprising, a pair of output terminals, means supplying said signal voltage to said terminals, a pair of unilateral conducting devices connected across said terminals in oppositely poled parallel circuit relation, means for deriving from an alternating voltage source pulsating unidirectional voltages having pulse shapes substantially the same as said alternating signal voltage, said means including three unilateral conducting devices and a switching means, said switching means including a two position switch, one position of said switch connecting two of said three unilateral conducting devices in circuit to provide pulsating unidirectional voltages of the same frequency as said signal voltage and the second position of said switch connecting the other unilateral conducting device in circuit with one of the first two unilateral conducting devices to provide pulsating unidirectional voltages of twice the frequency as said signal voltage, and means utilizing either of said pulsating unidirectional voltages to oppositely bias said first named unidirectional conducting devices.

2. A phase selective limiter for an amplitude modulated alternating signal voltage of predetermined wave shape comprising, a pair of output terminals; means supplying said signal voltage to said terminals; a pair of diodes connected across said terminals in oppositely poled parallel relationship; and biasing means for supplying between one terminal of each of said diodes and one of said output terminals pulsating unidirectional biasing potentials of constant amplitude synchronized with half cycles of said signal voltages; said biasing potentials having a pulse shape substantially the same as said predetermined wave shape; said biasing means including three unilateral conducting devices and a switching means, said switching means including a two-position switch having contacts connected to said three unilateral conducting devices; one position of said switching means electrically connecting two of said three unilateral conducting devices in circuit for providing biasing potentials having the same frequency as said signal voltage; and another position of said switching means electrically connecting the other unilateral conducting device in circuit with one of the first two unilateral conducting devices for providing biasing potentials having twice the frequency of said signal voltage.

References Cited in the file of this patent

UNITED STATES PATENTS 2,683,226 Kerpchar ---------------- July 6, 1954